(12) United States Patent
Hall

(10) Patent No.: US 7,969,432 B2
(45) Date of Patent: Jun. 28, 2011

(54) PROVIDING FOR APPLICATION INTEGRITY, IMPROVED START-UP TIME, AND REDUCED MEMORY UTILITIZATION IN A SAFETY-CRITICAL GRAPHICS PROCESSING ENVIRONMENT

(75) Inventor: Christopher J. Hall, Boston, MA (US)

(73) Assignee: Presagis, Montreal, Quebec (CA)

( * ) Notice: Subject to any disclaimer, the term of this patent is extended or adjusted under 35 U.S.C. 154(b) by 367 days.

(21) Appl. No.: 11/662,741

(22) PCT Filed: Sep. 9, 2005

(86) PCT No.: PCT/US2005/032529
§ 371 (c)(1),
(2), (4) Date: Nov. 16, 2007

(87) PCT Pub. No.: WO2006/031796
PCT Pub. Date: Mar. 23, 2006

(65) Prior Publication Data
US 2008/0100637 A1    May 1, 2008

Related U.S. Application Data

(60) Provisional application No. 60/609,854, filed on Sep. 13, 2004.

(51) Int. Cl.
*G06T 15/00* (2006.01)

(52) U.S. Cl. .......... 345/418; 345/501; 719/311; 719/323
(58) Field of Classification Search .................. 345/418, 345/501; 719/311, 323; 716/8
See application file for complete search history.

(56) References Cited

U.S. PATENT DOCUMENTS

| 5,706,478 A | 1/1998 | Dye |
| 5,734,582 A * | 3/1998 | Bertolet et al. .................. 716/8 |
| 5,745,761 A * | 4/1998 | Celi et al. ...................... 719/323 |
| 5,881,285 A * | 3/1999 | DeLeeuw ...................... 719/311 |
| 6,295,068 B1 | 9/2001 | Peddada et al. |
| 6,469,704 B1 | 10/2002 | Johnson |
| 6,567,091 B2 * | 5/2003 | Dye et al. ..................... 345/501 |

OTHER PUBLICATIONS

Buck I et al.; "Tracking Graphics state for networked rendering" Proceedings 2000 Siggraph/Eurographics Workshop on Graphics Hardware. Interlaken, Switzerland, Aug. 21-22, 2000; [Siggraph/Eurographics Workshop on Graphics Hardware], New York, NY: ACM, US, Aug. 21, 2000, pp. 87-95, XP002291511 ISBN: 978-1-58113-257-1.

* cited by examiner

*Primary Examiner* — Phu Nguyen
(74) *Attorney, Agent, or Firm* — FSP LLC

(57) ABSTRACT

At least one of graphics operation description information or graphics object description information (106) is included within application logic (102). At least one of the graphics operation description information or graphics object description information (106) is included in the program address space of a graphics driver (108).

7 Claims, 2 Drawing Sheets

PROVIDING FOR APPLICATION INTEGRITY, IMPROVED START-UP TIME, AND REDUCED MEMORY UTILITIZATION IN A SAFETY-CRITICAL GRAPHICS PROCESSING ENVIRONMENT

PRIORITY CLAIM

Priority is hereby claimed to the U.S. provisional patent application entitled PROVIDING FOR APPLICATION INTEGRITY, IMPROVED START-UP TIME, AND REDUCED MEMORY UTILITIZATION IN A SAFETY-CRITICAL GRAPHICS PROCESSING ENVIRONMENT, having application No. 60/609,854, filed on Sep. 13, 2004.

TECHNICAL FIELD

The present disclosure relates to reducing the start-up time and memory utilization, and improving the reliability of, graphic processing environments.

BACKGROUND ART

A graphical processing environment typically comprises multiple graphics applications each specifying graphics for an area of the display, referred to as a window. The graphics application defines graphics objects, and operations to perform on those objects. For example, a graphics application may specify lines, ellipses, and rectangles, and the size, color, fill, opacity, luminosity, etc. of surfaces of those objects. A graphics object description may include, among other things, a collection of vertices and the edges formed by those vertices. Graphics operations may include, among other things scaling, rotation, deformation, and surfacing attributes of graphics objects.

At the time a graphics application is initiated (e.g. loaded and executed by the operating environment), the graphics application may provide a set of graphic object descriptions and operations to a graphic system device driver. The object descriptions and operations may be provided to the driver using application program interfaces, resulting in substantial bus and processor utilization. The object descriptions and operation descriptions are duplicated in both application and driver program address space, resulting in inefficient memory utilization.

DISCLOSURE OF INVENTION

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

At least one of graphics operation description information or graphics object description information is included within application logic. At least one of the graphics operation description information or graphics object description information is included in the program address space of a graphics driver. Preprocessing may be performed to ascertain whether the at least one of graphics operation description information or graphics object description information has acceptable effects on the graphics system. The graphics operation description information may include information about the size, position, color, or surface attributes of a graphics object, among other things. The graphics object description information may include vertex descriptions of graphics objects.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
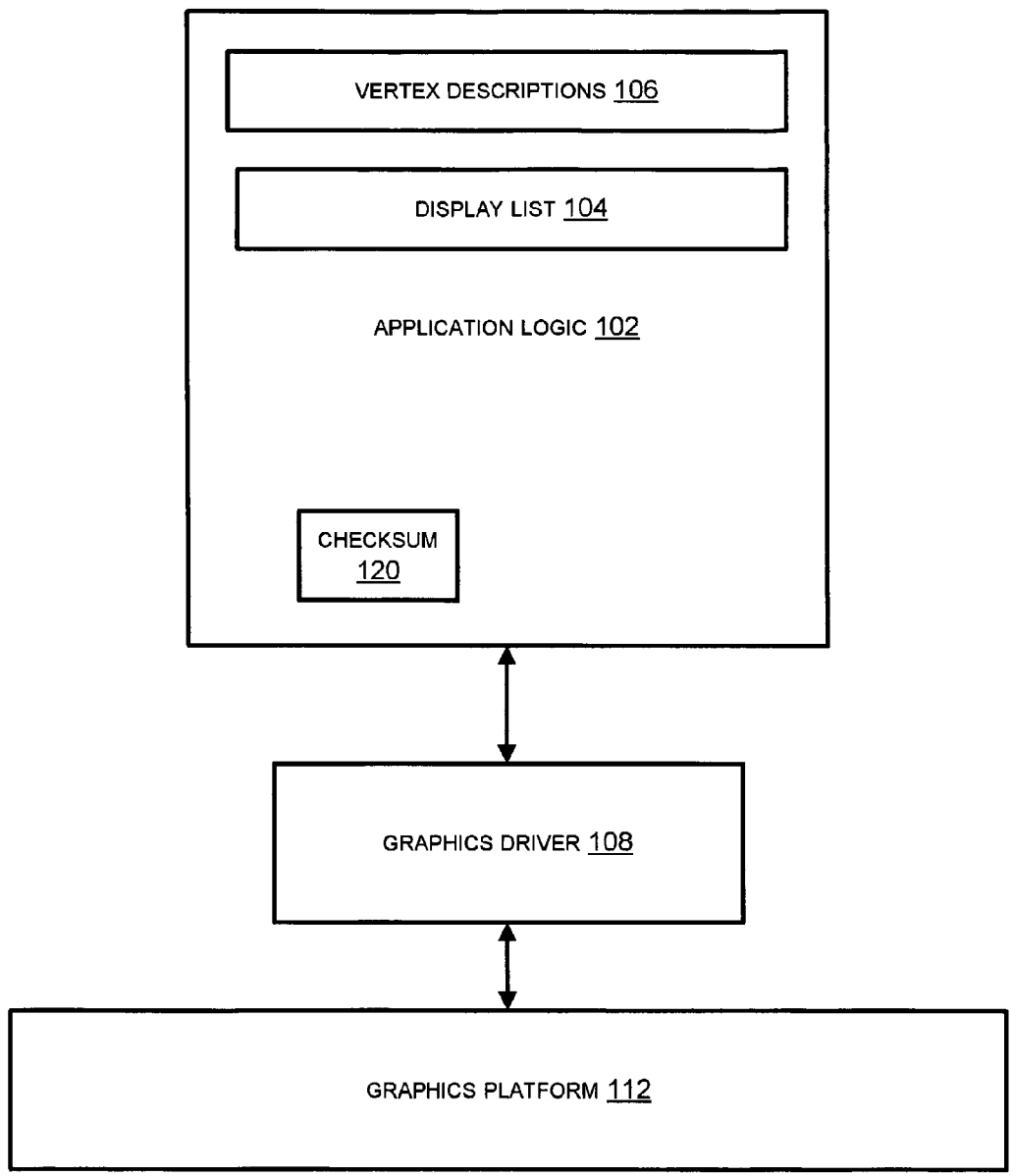
FIG. 1 is a block diagram of an embodiment of a graphics application and graphics application environment.

FIG. 1 is a block diagram of an embodiment of a graphics application and graphics application environment. The application logic 102 comprises a display list 104 (a commonly applied term for a description of graphics information associated with a graphics application), vertex descriptions 106 (comprising a set of vertices of at least one shape, and at least some interconnections between those vertices, e.g. edges), and a checksum 120 (a value representing values and/or an arrangement of information in at least one of the display list 104 and vertex descriptions 106). The checksum 120 provides an indication of the overall composition of the display list 104 and/or vertex descriptions 106.

The application logic 102 communicates with the graphics platform 112 via a graphics driver 108. The graphics driver 108 communicates with the graphics platform 112 on behalf of the application logic 102.

Graphics operation description information, such as the display list 104, describes attributes of a graphics object; for example, information about at least one of size, position, color, or surface attributes of a graphics object. Surface attributes include the texture, bump map, shadowing, lighting, opacity, and luminosity to apply to a graphic object surface. Graphics object description information, such as the vertex descriptions 106, define a shape in one or more dimensions.

The application logic 102 typically comprises signals retained in a machine memory (e.g. software), to affect the operation of one or more data processing circuits. Logic may also in some instances comprise circuits.

The graphics driver 108 communicates with the graphics platform 112 on behalf of one or more graphics applications. Included in the graphics driver's 108 program address space (memory address locations from which the driver logic 108 may access instructions and/or data without invoking system protection violations) are at least some of the display list 104 and/or the vertex descriptions 106. The graphics driver 108 examines the checksum 120 (or some other indication of the overall composition of the display list 104 and/or vertex descriptions 106) to ascertain whether it is safe to carry out the graphics operations defined by the display list 104 and vertex descriptions 106, in other words, to determine if the composition of at least some of the display list 104 and/or vertex descriptions 106 has not been altered from an earlier, "certified" composition.

By accessing at least some of the display list 104 and/or vertex descriptions 106 in its own address space, the graphics driver 108 may access and carry out graphics operations of the application logic 102 without copying some or all of the display list 104 and/or vertex descriptions 106 across platform busses. Memory, processor, and bus resources of the graphics platform 112 are thus conserved.

The graphics platform 112 comprises circuits and/or logic to carry out low-level graphics operations and control the appearance of one or more display devices (screens, monitors, televisions, etc.) The graphics platform 112 typically comprises one or more graphics processors, display buffer, and display control circuits, among other things.

Figure 2:
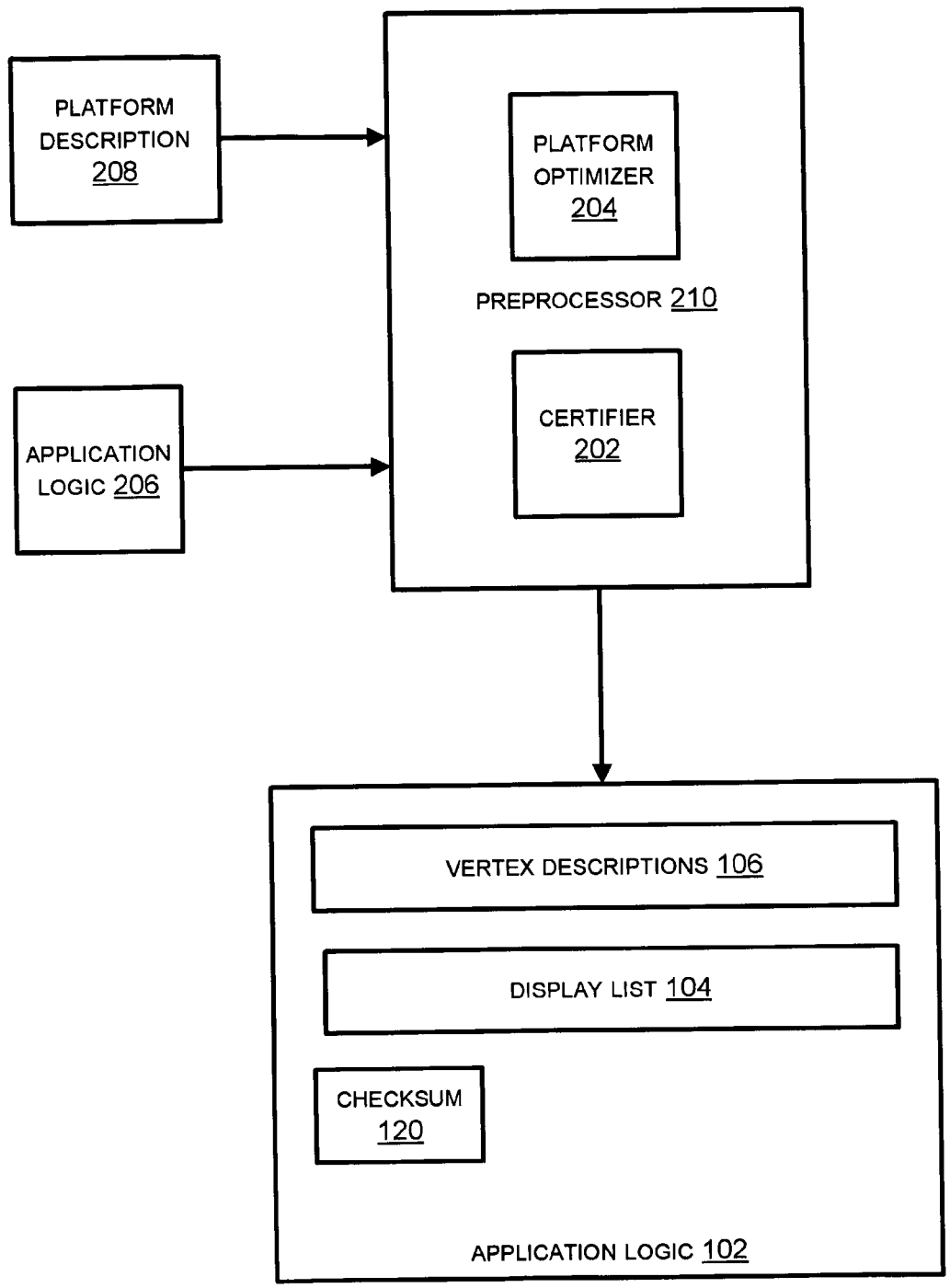
FIG. 2 is a block diagram of an embodiment of a technique for creating a gi application incorporating graphics object and operation descriptions.

FIG. 2 is a block diagram of an embodiment of a technique for creating a graphics application incorporating graphics object and operation descriptions. The preprocessor 210 comprises a certifier 202 and a platform optimizer 204. The application logic 102 comprises a checksum 216 (or some other indication of content composition), a display list 104, and vertex descriptions 106. The preprocessor 210 receives the (unprocessed) application logic 206 and the platform description 208, and produces the processed application logic 102.

The display list 104 and/or vertex descriptions 106 may be generated by the preprocessor 210 according to descriptive information 208 about the graphics system. Examples of descriptive information 208 are attributes of the graphics processor, display resolution, color capabilities, memory resources, and available graphics operations.

Preprocessing of the application logic 102 may occur before deploying the application logic to the graphics platform 112. Preprocessing may include analyzing the application logic 206 to ascertain whether the at least one of graphics operation description information (e.g. display list 104) or graphics object description information (e.g. vertex descriptions 106) has acceptable effects on the graphics platform 112. For example, the preprocessor 210 may analyze for indications that applying the display list 104 and vertex descriptions 106 may corrupt the contents of a display, disrupt/confuse the graphics processor, cause unacceptably long processing times by the graphics platform 112, and/or produce undesirable states in the graphics platform 112. The preprocessor 210 may apply the platform description 208 when analyzing for indications of unacceptable effects associated with the display list 104 and vertex descriptions 106.

The preprocessor 210 may analyze the application logic 206 to create the display list 104 and/or vertex descriptions 106, and to incorporate these within a loader-compatible version of the application logic 102. Loader-compatible application logic 102 is application logic modified/enhanced so that application loader logic may load the application logic into the graphics system 112 memory in a form suitable for execution (e.g. a form suitable to affect the operation of one of more data processing circuits of the graphics system 112).

The preprocessor 210 may generate the checksum 216 (or other indication of composition, such as a digital certificate) and include the checksum 216 in the loader-compatible application logic 102 to provide an indication of the composition of at least some of the display list 104 and vertex descriptions 106. Once the application logic 102 is loaded by the graphics platform 112, the graphics driver 108 may generate a checksum or other indication from the at least part of the display list 104 and vertex descriptions 106, and compare this indication with the checksum 216 included with the application logic 102. If the two indications match, it is highly likely that the composition of the display list 104 and/or vertex descriptions 106 is unaltered from the time when they were generated by the preprocessor 210. Thus the driver 108 may proceed to carry out the operations defined by the display list 104/vertex descriptions 106 with substantially reduced risk of creating unacceptable conditions/states/behaviors in the graphics platform 112.

When the application logic 102 is loaded in the graphics platform 112, at least some of the graphics operation description information and/or graphics object description information of the application logic 102 is included in the program address space of a graphics driver 108 that is employed by the application logic 102, resulting in the benefits to load time and resource utilization previously described.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method comprising:
   storing graphics operation description information in a stored location in application logic embodied in machine circuits; and
   causing the stored location of the graphics operation description information in the application logic to become part of a program address space of graphics driver logic embodied in the machine circuits;
   the driver logic accessing the stored location and testing effects on a graphics system of graphics operations defined by the graphics operation description information and/or graphics object description information before the graphics operations are invoked by the application logic.

2. The method of claim 1 further comprising:
   graphics operation description information comprises information about at least one of size, position, color, or surface attributes of a graphics object.

3. The method of claim 1 further comprising:
   the application logic comprising graphics object description information that comprises vertex descriptions of at least one graphics object.

4. A method comprising:
   adapting application logic embodied in machine circuits to create graphics operation description information; and
   incorporating the graphics operation description information in a stored location in a loader-compatible version of the application logic embodied in the machine circuits, and making the stored location part of an address space of a graphics device driver;
   the driver logic accessing the stored location and testing effects on a graphics system of graphics operations defined by the graphics operation description information and/or graphics object description information before the graphics operations are invoked by the application logic.

5. The method of claim 4 further comprising:
loading the application logic including the graphics operation description information; and
including the graphics operation description information in the program address space of a graphics driver that is employed by the application logic.

6. The method of claim 4 further comprising:
creating at least part of the graphics operation description information according to descriptive information about a graphics system.

7. The method of claim 4 further comprising:
including in the application logic an indication of the overall composition of the graphics operation description information; and
a graphics driver checking the indication of the overall composition of the graphics operation description information before graphics operations defined by the graphics operation information are invoked, to ascertain whether it is safe to carry out the graphics operations defined by the at least one of graphics operation description information.

* * * * *